(12) United States Patent
Ryu et al.

(10) Patent No.: US 11,351,763 B2
(45) Date of Patent: Jun. 7, 2022

(54) POLYAMIDE FILM LAMINATE

(71) Applicant: LG CHEM, LTD., Seoul (KR)

(72) Inventors: Bi Oh Ryu, Daejeon (KR); Soonyong Park, Daejeon (KR); Youngseok Park, Daejeon (KR); Young Ji Tae, Daejeon (KR); Kwanyeol Paek, Daejeon (KR); Il Hwan Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/976,706

(22) PCT Filed: May 3, 2019

(86) PCT No.: PCT/KR2019/005995
§ 371 (c)(1),
(2) Date: Aug. 28, 2020

(87) PCT Pub. No.: WO2019/212326
PCT Pub. Date: Nov. 7, 2019

(65) Prior Publication Data
US 2021/0002425 A1 Jan. 7, 2021

(30) Foreign Application Priority Data

May 4, 2018 (KR) .................. 10-2018-0051930

(51) Int. Cl.
*B32B 27/34* (2006.01)
*B32B 27/08* (2006.01)

(52) U.S. Cl.
CPC .............. *B32B 27/34* (2013.01); *B32B 27/08* (2013.01); *B32B 2250/02* (2013.01); *B32B 2250/03* (2013.01); *B32B 2250/24* (2013.01); *B32B 2457/20* (2013.01); *Y10T 428/31728* (2015.04)

(58) Field of Classification Search
CPC ..... B32B 27/34; B32B 27/08; B32B 2457/20; B32B 2250/02; B32B 2250/03; B32B 2250/24; Y10T 428/31728; C08G 69/28; C08G 69/26; C08G 69/32; C08K 3/013; C08J 5/18; C08L 77/06; C08L 77/10; C08L 77/00
See application file for complete search history.

(56) References Cited

U.S. PATENT DOCUMENTS

| | | | |
|---|---|---|---|
| 3,723,241 A * | 3/1973 | Rakus et al. | B32B 27/00 428/474.7 |
| 8,592,549 B1 | 11/2013 | Grcev et al. | |
| 2004/0037983 A1 | 2/2004 | Reighard et al. | |
| 2007/0148480 A1* | 6/2007 | Ishiwata | B32B 27/08 428/473.5 |
| 2009/0318660 A1 | 12/2009 | Bos et al. | |
| 2012/0238698 A1 | 9/2012 | Cho et al. | |
| 2016/0083538 A1 | 3/2016 | Sun et al. | |
| 2017/0022336 A1 | 1/2017 | Sun et al. | |

FOREIGN PATENT DOCUMENTS

| | | |
|---|---|---|
| CN | 1922011 A | 2/2007 |
| CN | 101511938 A | 8/2009 |
| CN | 103597013 A | 2/2014 |
| JP | H06-055713 A | 3/1994 |
| JP | 2015-142986 A | 8/2015 |
| KR | 10-2006-0134907 A | 12/2006 |
| KR | 10-2012-0105720 A | 9/2012 |
| KR | 10-2015-0069318 A | 6/2015 |
| KR | 10-2015-0070757 A | 6/2015 |
| KR | 10-2015-0076676 A | 7/2015 |
| KR | 10-2015-0076677 A | 7/2015 |
| KR | 10-2015-0083933 A | 7/2015 |
| KR | 10-2016-0081613 A | 7/2016 |
| KR | 10-2017-0105477 A | 9/2017 |
| WO | 2005-061227 A1 | 7/2005 |

OTHER PUBLICATIONS

International Search Report issued for International Application No. PCT/KR2019/005995 dated Aug. 26, 2019, 4 pages.

* cited by examiner

*Primary Examiner* — John D Freeman
(74) *Attorney, Agent, or Firm* — Rothwell, Figg, Ernst & Manbeck, P.C.

(57) ABSTRACT

The present disclosure relates to a polyamide block copolymer and a polyamide film including the same. The polyamide block copolymer according to the present disclosure makes it possible to provide a polyamide film exhibiting excellent mechanical properties while being colorless and transparent.

11 Claims, No Drawings

POLYAMIDE FILM LAMINATE

CROSS-REFERENCE TO RELATED APPLICATION

This application is a 35 U.S.C. 371 National Phase Entry Application from PCT/KR2019/005995, filed on May 3, 2019, designating the United States, which claims the benefit of Korean Patent Application No. 10-2018-0051930 filed on May 4, 2018 with the Korean Intellectual Property Office, the disclosures of which are incorporated herein by reference in their entirety.

TECHNICAL FIELD

The present disclosure relates to a polyamide film laminate.

BACKGROUND OF ART

An aromatic polyimide resin is a polymer mostly having an amorphous structure, and exhibits excellent heat resistance, chemical resistance, electrical properties, and dimensional stability due to its rigid chain structure. The polyimide resin is widely used as an electric/electronic material.

However, the polyimide resin has many limitations in use, because it is dark brown due to the formation of a CTC (charge transfer complex) of Pi-electrons present in the imide chain.

In order to solve the limitations and obtain a colorless transparent polyimide resin, a method of restricting the movement of the Pi-electrons by introducing a strong electron attracting group such as a trifluoromethyl ($—CF_3$) group, a method of reducing the formation of the CTC by introducing a sulfone ($—SO_2—$) group, an ether ($—O—$) group, or the like into the main chain to make a bent structure, or a method of inhibiting the formation of the resonance structure of the Pi-electrons by introducing an aliphatic cyclic compound, has been proposed.

However, it is difficult for the polyimide resin according to the proposals to exhibit sufficient heat resistance due to the bent structure or the aliphatic cyclic compound, and a film prepared using the same still has limitations such as poor mechanical properties.

On the other hand, in recent years, polyamide copolymers having a polyamide unit structure to improve scratch resistance of polyimide have been developed.

However, when a film is formed by coating the polyamide copolymer, haze and yellow index are increased due to high crystallinity of the copolymer. Particularly, this phenomenon becomes severe as the film becomes thicker, and a method for improving it is required.

BRIEF SUMMARY OF THE INVENTION

The present disclosure is to provide a polyamide film laminate exhibiting excellent mechanical properties while having excellent optical properties.

There is provided a polyamide film laminate, including

A)
a first polyamide resin layer including an amide bond by an aromatic diamino group and a benzene-dicarbonyl group,
wherein a ratio of benzene-1,3-dicarbonyl group to a total of benzene-1,3-dicarbonyl group and benzene-1,4-dicarbonyl group is 20 mol % or less, and B)
a second polyamide resin layer formed on at least one surface of the first polyamide resin layer and including an amide bond by an aromatic diamino group and a benzene-dicarbonyl group,
wherein a ratio of benzene-1,3-dicarbonyl group to a total of benzene-1,3-dicarbonyl group and benzene-1,4-dicarbonyl group is more than 20 mol %.

DETAILED DESCRIPTION OF THE INVENTION

Hereinafter, the polyamide film laminate according to the exemplary embodiments of the present disclosure will be described in more detail.

The terms are used merely to refer to specific embodiments, and are not intended to restrict the present disclosure unless it is explicitly expressed.

Singular expressions of the present disclosure may include plural expressions unless it is differently expressed contextually.

The terms "include", "comprise", and the like of the present disclosure are used to specify certain features, regions, integers, steps, operations, elements, and/or components, and these do not exclude the existence or the addition of other certain features, regions, integers, steps, operations, elements, and/or components.

According to an embodiment of the present disclosure, provided is a polyamide film laminate, including A)
a first polyamide resin layer including an amide bond by an aromatic diamino group and a benzene-dicarbonyl group,
wherein a ratio of benzene-1,3-dicarbonyl group to a total of benzene-1,3-dicarbonyl group and benzene-1,4-dicarbonyl group is 20 mol % or less, and B)
a second polyamide resin layer formed on at least one surface of the first polyamide resin layer and including an amide bond by an aromatic diamino group and a benzene-dicarbonyl group,
wherein a ratio of benzene-1,3-dicarbonyl group to a total of benzene-1,3-dicarbonyl group and benzene-1,4-dicarbonyl group is more than 20 mol %.

As a result of studies by the present inventors, when preparing a polyamide copolymer, a film, or a film laminate using the same by reacting an amine moiety of an aromatic diamine monomer with a carbonyl group of a benzene-dicarbonyl-based monomer (such as phthaloyl chloride), it was confirmed that the copolymer can be used for a flexible display device and the like by adjusting the ratio of the benzene-1,3-dicarbonyl group (or isophthaloyl unit, isophthaloyl chloride originated unit, IPC) and the benzene-1,4-dicarbonyl group (or terephthaloyl unit, terephthaloyl chloride originated unit, TPC) to a specific range in the polyamide used in each resin layer, because it does not have a large loss in strength and hardness while having a flexible structure.

According to an embodiment of the present disclosure, the polyamide film laminate I) is in the form of a laminate including a first polyamide resin layer and a second polyamide resin layer, and II) the first polyamide resin layer includes a first polyamide copolymer and the second polyamide resin layer includes a second polyamide copolymer.

III) The first and second polyamide copolymers are each independently a polyamide copolymer including both A. an amide repeating unit (hereinafter, referred to as a first amide repeating unit) in which an amine group of the aromatic diamine monomer and a carbonyl group of the isophthaloyl-based monomer form an amide bond, and B. an amide repeating unit (hereinafter, referred to as a second amide repeating unit) in which an amine group of the aromatic diamine monomer and a carbonyl group of the terephthaloyl-based monomer form an amide bond.

C. However, the first and second polyamides include the first amide repeating unit and the second amide repeating unit at different ratios from each other.

Herein, in the polyamide resin laminate, a polyamide copolymer having a ratio of benzene-1,3-dicarbonyl group to a total of benzene-1,3-dicarbonyl group derived from an isophthaloyl-based monomer and benzene-1,4-dicarbonyl group derived from a terephthaloyl-based monomer of 20 mol % or less is referred to as a first polyamide copolymer, and a resin layer constituted thereby is referred to as a first polyamide resin layer.

In addition, in the polyamide resin laminate, a polyamide copolymer having a ratio of benzene-1,3-dicarbonyl group to a total of benzene-1,3-dicarbonyl group derived from an isophthaloyl-based monomer and benzene-1,4-dicarbonyl group derived from a terephthaloyl-based monomer of more than 20 mol % is referred to as a second polyamide copolymer, and a resin layer constituted thereby is referred to as a second polyamide resin layer.

Referring to the amide repeating unit described above, it can be seen that a ratio of the first amide repeating unit to a total of the first amide repeating unit and the second amide repeating unit is 20 mol % or less in the first polyamide copolymer of the first polyamide resin layer, and a ratio of the first amide repeating unit to a total of the first amide repeating unit and the second amide repeating unit is more than 20 mol % in the second polyamide copolymer of the second polyamide resin layer.

According to an embodiment of the present disclosure, in the first polyamide resin layer, the ratio of benzene-1,3-dicarbonyl group to a total of benzene-1,3-dicarbonyl group and benzene-1,4-dicarbonyl group may be about 2 mol % to about 20 mol %, preferably about 2 mol % to about 5 mol %.

In the second polyamide resin layer, the ratio of benzene-1,3-dicarbonyl group to a total of benzene-1,3-dicarbonyl group and benzene-1,4-dicarbonyl group may be more than about 20 mol % and about 40 mol % or less.

The repeating unit derived from the benzene-1,3-dicarbonyl group, a isophthaloyl-based monomer (IPC), may interfere with chain packing and alignment in the polymer due to bent molecular geometry. In addition, it may expand amorphous region in the polyamide copolymer, thereby improving optical properties and folding endurance of the polyamide film.

The repeating unit derived from the benzene-1,4-dicarbonyl group, a terephthaloyl-based monomer (TPC), may maintain chain packing and alignment in the polymer due to linear molecular geometry. In addition, it may expand crystalline region in the polyamide copolymer, thereby improving surface hardness and mechanical properties of the polyamide film.

Therefore, the first polyamide copolymer and the first polyamide resin layer constituted by the same in which the ratio of benzene-1,3-dicarbonyl group to a total of benzene-1,3-dicarbonyl group and benzene-1,4-dicarbonyl group is about 20 mol % or less may impart relatively good surface hardness and mechanical properties to the polyamide film laminate.

In addition, the second polyamide copolymer and the second polyamide resin layer constituted by the same in which the ratio of benzene-1,3-dicarbonyl group to a total of benzene-1,3-dicarbonyl group and benzene-1,4-dicarbonyl group is more than about 20 mol % may impart relatively good optical properties and folding endurance to the polyamide film laminate.

According to an embodiment of the present disclosure, it is preferable that the first polyamide resin layer and the second polyamide resin layer are formed at a thickness ratio of about 30:70 to about 1:99. It may be preferable that the first polyamide resin layer is laminated on the outer layer facing viewers when used on top of the film laminate, i.e., a display device.

The polyamide film laminate of the present disclosure includes both the first polyamide resin layer and the second polyamide resin layer described above, and particularly, the thickness ratio of the first polyamide resin layer to the second polyamide resin layer is maintained within the above range in the entire polyamide film laminate. Thus, advantages of each of the first and second polyamide copolymers can be realized very effectively.

According to an embodiment of the present disclosure, the polyamide film laminate may have a ratio of benzene-1,3-dicarbonyl group to a total of benzene-1,3-dicarbonyl group and benzene-1,4-dicarbonyl group of about 5 to about 25 mol % in the entire film laminate.

That is, since the ratio of benzene-1,3-dicarbonyl group in the entire film laminate including all of the copolymers and the resin layers constituted by the same, as well as the ratio of benzene-1,3-dicarbonyl group and benzene-1,4-dicarbonyl group in the first and second polyamide copolymers, is within the above range, the above-mentioned polyamide film laminate may have excellent optical properties such as haze and yellow index, and at the same time, excellent mechanical properties such as folding endurance and surface hardness.

The above-mentioned aromatic diamino group may be derived from an aromatic diamine monomer containing two amino groups at the ends around the aromatic ring. For example, the aromatic diamino group may be derived from at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl) sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, and 4,4'-diaminobenzanilide.

More preferably, the aromatic diamine monomer may be 2,2'-bis(trifluoromethyl)-4,4'-biphenyldiamine (TFDB) or 2,2'-dimethyl-4,4'-diaminobenzidine.

According to another embodiment of the present disclosure, the first and the second polyamide copolymers are carbonyl groups forming an amide bond with the above-mentioned aromatic diamino group, and may further include a carbonyl group derived from an aromatic dicarbonyl monomer or a tricarbonyl monomer, in addition to the benzene-1,3-dicarbonyl group and benzene-1,4-dicarbonyl group.

Examples of the aromatic dicarbonyl monomer include 4,4'-biphenyldicarbonyl chloride, and the like, and examples of the aromatic tricarbonyl monomer include trimesoyl chloride, and the like.

In particular, the aromatic tricarbonyl monomer may act as a cross-linking agent in the copolymerization to further improve mechanical properties of the polyamide block copolymer.

In order to achieve this effect, the aromatic tricarbonyl monomer may be included in an amount of about 0.01 mol % or more, about 0.025 mol % or more, or about 0.05 mol % or more, and about 5.0 mol % or less, about 2.5 mol % or less, about 1.5 mol % or less, or about 1.25 mol % or less of the total carbonyl-derived monomer. When the aromatic tricarbonyl monomer is excessively used, optical properties of the polyamide copolymer to be prepared may be deteriorated and flexibility may be lowered.

In the mean time, polymerization conditions for preparing the polyamide containing the amide bond by the aromatic diamino group and the benzene-dicarbonyl group by polymerizing the aromatic diamine monomer and the aromatic dicarbonyl monomer are not particularly limited. However, in order to vary the ratio of the repeating units in the first and second polyamide copolymers, the monomers may be added in different amounts.

Specifically, the first polyamide copolymer may be prepared by a method including the steps of:
i) mixing benzene-1,3-dicarbonyl monomer, benzene-1,4-dicarbonyl monomer, and aromatic diamine monomer,
ii) wherein the benzene-1,3-dicarbonyl monomer is included in an amount of 20 mol % or less based on a total of the benzene-1,3-dicarbonyl monomer and the benzene-1,4-dicarbonyl monomer,
iii) and then forming an amide bond between the amine group and the carbonyl group.

In addition, the second polyamide copolymer may be prepared by a method including the steps of:
i) mixing benzene-1,3-dicarbonyl monomer, benzene-1,4-dicarbonyl monomer, and aromatic diamine monomer,
ii) wherein the benzene-1,3-dicarbonyl monomer is included in an amount of more than 20 mol % on a total of the benzene-1,3-dicarbonyl monomer and the benzene-1,4-dicarbonyl monomer,
iii) and then forming an amide bond between the amine group and the carbonyl group.

The polymerization reaction for forming the polyamide may be carried out by a solution polymerization under an inert gas atmosphere at a temperature of about minus 25° C. to about 25° C., more preferably about minus 25° C. to 0° C. Specific examples of the above-mentioned monomers and the like are as described above in the polyamide copolymer.

Herein, as the reaction solvent, N,N-dimethylformamide, N,N-dimethylacetamide, dimethylsulfoxide, acetone, N-methyl-2-pyrrolidone, tetrahydrofuran, chloroform, gamma-butyrolactone, or the like may be used.

According to an embodiment of the present disclosure, the polyamide copolymer may have a weight average molecular weight of about 10,000 to about 700,000 g/mol, about 10,000 to about 500,000 g/mol, about 100,000 to about 500,000 g/mol, or about 300,000 to about 450,000 g/mol.

Herein, the weight average molecular weight may be measured by gel permeation chromatography (GPC).

When a film laminate is prepared using the above-mentioned polyamide block copolymer, flexibility as well as excellent optical and mechanical properties may be exhibited, and thus the laminate can be used as a material for various molded articles. For example, the polyamide film laminate may be applied to a substrate for a display, a protective film for a display, a touch panel, a window cover of a foldable device, or the like.

The polyamide film laminate may be prepared by a conventional method such as a dry method or a wet method using the polyamide copolymer.

For example, the polyamide film laminate may be obtained by a method including the steps of:
coating a solution containing the second polyamide copolymer on an arbitrary support to form a film; drying the film by evaporating solvents to form a second polyamide resin layer on the support;
coating a solution containing the first polyamide copolymer on the second polyamide resin layer to form a film; and drying the film by evaporating solvents to form a first polyamide resin layer on the support.

According to another embodiment, the polyamide film laminate may be formed by coating a solution containing the second polyamide copolymer on an arbitrary substrate to form a second film; coating a solution containing the first polyamide copolymer on the second film to form a first film; and drying the films by evaporating solvents.

Accordingly, according to another embodiment of the present disclosure, there may be provided a polyamide film laminate, including a substrate; the first polyamide resin layer; and the second polyamide resin layer.

As described above, it is preferable that the polyamide resin laminate has a second polyamide resin layer formed on a substrate, and a first polyamide resin layer formed on the second polyamide resin layer.

The first and second polyamide resin layers may be formed on one surface or both surfaces of the substrate, and may further include a separate functional layer on the first polyamide resin layer or between the substrate and the second polyamide resin layer.

The substrate may include at least one polymer selected from the group consisting of polyimide-based, polycarbonate-based, polyester-based, polyalkyl(meth)acrylate-based, polyolefin-based and polycyclicolefin-based polymers.

If necessary, stretching and heat treatment for the polyamide film laminate may be carried out.

The polyamide film laminate may exhibit excellent mechanical properties while being colorless and transparent, because it is prepared using the above-described polyamide copolymers having different properties.

Specifically, the polyamide film laminate may have yellow index (YI) with respect to a specimen having a thickness of 50±2 μm measured according to ASTM E313 of about 3.0 or less, or about 2.5 or less.

Further, the polyamide film laminate may satisfy the following Formula 1:

$$YI_1 - YI_0 < 3.0 \quad \text{[Formula 1]}$$

in Formula 1,
$YI_1$ and $YI_0$ are yellow index of the polyamide film laminate measured according to ASTM E313,
$YI_0$ is initial yellow index of the polyamide film laminate, and
$YI_1$ is yellow index measured after exposing the polyamide film laminate to ultraviolet rays and moisture for 96 hours according to ASTM G53-96.

That is, the polyamide film laminate according to the embodiment of the present disclosure may maintain excellent optical properties such as no yellowing phenomenon not only at the initial stage but also exposed to ultraviolet rays or moisture for a long time.

In addition, the polyamide film laminate may have haze with respect to a specimen having a thickness of 50±2 μm measured according to ASTM D1003 of about 1.0% or less, or about 0.7% or less.

In addition, the polyamide film laminate may have modulus measured according to ISO 527-3 of about 6 GPa or more, preferably about 6.5 GPa or more.

In addition, the polyamide film laminate may have elongation measured according to ISO 527-3 of about 10% or more, preferably about 15% or more.

In addition, the polyamide film laminate may have pencil hardness with respect to a specimen having a thickness of 50±2 μm measured according to ASTM D3363 of 3H or more.

Advantageous Effects

The polyamide film laminate according to the present disclosure may exhibit excellent mechanical properties while being colorless and transparent.

DETAILED DESCRIPTION OF THE EMBODIMENTS

Hereinafter, preferred examples are provided for better understanding. However, these examples are for illustrative purposes only, and the invention is not intended to be limited by these examples.

Preparation of First Polyamide Copolymer

Preparation Example 1-1

In a 500 mL 4-neck round-bottom flask (reactor) equipped with a stirrer, a nitrogen injector, a dropping funnel, and a temperature controller, 184 g of N,N-dimethylacetamide (DMAc) was placed with slowly blowing nitrogen. The temperature of the reactor was adjusted to −10° C., and then 0.030343 mol of 2,2'-bis(trifluoromethyl)-4,4'-biphenyldiamine (TFDB) was dissolved.

0.002731 mol of isophthaloyl chloride (IPC) and 0.028219 mol of terephthaloyl chloride (TPC) were sequentially added thereto at about 5 minute-intervals, and stirred. Thereafter, an amide formation reaction was carried out at about −10° C. for about 60 minutes.

After completion of the reaction, DMAc was added to dilute to a solid content of 5% or less, and then precipitated using 1 L of methanol. The precipitated solid was filtered and then dried at 100° C. under vacuum for about 6 hours or more to obtain a polyamide copolymer in the form of solid (weight average molecular weight: about 431,122 g/mol; IPC ratio: 8.82 mol %).

Preparation Example 1-2

In a 500 mL 4-neck round-bottom flask (reactor) equipped with a stirrer, a nitrogen injector, a dropping funnel, and a temperature controller, 184 g of N,N-dimethylacetamide (DMAc) was placed with slowly blowing nitrogen. The temperature of the reactor was adjusted to −10° C., and then 0.030343 mol of 2,2'-bis(trifluoromethyl)-4,4'-biphenyldiamine (TFDB) was dissolved.

0.005765 mol of isophthaloyl chloride (IPC) and 0.025184 mol of terephthaloyl chloride (TPC) were sequentially added thereto at about 5 minute-intervals, and stirred. Thereafter, an amide formation reaction was carried out at about −10° C. for about 60 minutes.

After completion of the reaction, DMAc was added to dilute to a solid content of 5% or less, and then precipitated using 1 L of methanol. The precipitated solid was filtered and then dried at 100° C. under vacuum for about 6 hours or more to obtain a polyamide copolymer in the form of solid (weight average molecular weight: about 392,845 g/mol; IPC ratio: 18.63 mol %).

Preparation of Second Polyamide Copolymer

Preparation Example 2-1

In a 500 mL 4-neck round-bottom flask (reactor) equipped with a stirrer, a nitrogen injector, a dropping funnel, and a temperature controller, 184 g of N,N-dimethylacetamide (DMAc) was placed with slowly blowing nitrogen. The temperature of the reactor was adjusted to −10° C., and then 0.030343 mol of 2,2'-bis(trifluoromethyl)-4,4'-biphenyldiamine (TFDB) was dissolved.

0.010013 mol of isophthaloyl chloride (IPC) and 0.020936 mol of terephthaloyl chloride (TPC) were sequentially added thereto at about 5 minute-intervals, and stirred. Thereafter, an amide formation reaction was carried out at about −10° C. for about 60 minutes.

After completion of the reaction, DMAc was added to dilute to a solid content of 5% or less, and then precipitated using 1 L of methanol. The precipitated solid was filtered and then dried at 100° C. under vacuum for about 6 hours or more to obtain a polyamide copolymer in the form of solid (weight average molecular weight: about 399,721 g/mol; IPC ratio: 32.35 mol %).

Preparation of Film Laminate

Example 1

100 parts by weight of the second polyamide copolymer obtained in Preparation Example 2-1 and 5 parts by weight of a UV stabilizer (Tinuvin 329, manufactured by BASF) were dissolved in N,N-dimethylacetamide to prepare a second polyamide copolymer solution of about 15 wt %.

The second polyamide copolymer solution was applied on a polyimide-based substrate (UPILEX-75s, manufactured by UBE), and the thickness of the polymer solution was uniformly controlled using a film applicator (formation of a second polyamide resin layer).

Separately, 100 parts by weight of the first polyamide copolymer obtained in Preparation Example 1-1 and 5 parts by weight of a UV stabilizer (Tinuvin 329, manufactured by BASF) were dissolved in N,N-dimethylacetamide to prepare a first polyamide copolymer solution of about 15 wt %.

The first polyamide copolymer solution was applied on the second polyamide resin layer, and the thickness of the polymer solution was uniformly controlled using a film applicator (formation of a first polyamide resin layer).

This was dried in a mathis oven at about 120° C. for about 15 minutes, cured at about 250° C. for about 30 minutes while flowing nitrogen, and then peeled from the substrate to obtain a polyamide film laminate having a thickness of 50.0 μm.

In the laminate, the thickness of the second polyamide resin layer was 43 μm and the thickness of the first polyamide resin layer was 7 μm.

Example 2

100 parts by weight of the second polyamide copolymer obtained in Preparation Example 2-1 and 5 parts by weight of a UV stabilizer (Tinuvin 329, manufactured by BASF) were dissolved in N,N-dimethylacetamide to prepare a second polyamide copolymer solution of about 15 wt %.

The second polyamide copolymer solution was applied on a polyimide-based substrate (UPILEX-75s, manufactured by UBE), and the thickness of the polymer solution was uniformly controlled using a film applicator (formation of a second polyamide resin layer).

Separately, 100 parts by weight of the first polyamide copolymer obtained in Preparation Example 1-2 and 5 parts by weight of a UV stabilizer (Tinuvin 329, manufactured by BASF) were dissolved in N,N-dimethylacetamide to prepare a first polyamide copolymer solution of about 15 wt %.

The first polyamide copolymer solution was applied on the second polyamide resin layer, and the thickness of the polymer solution was uniformly controlled using a film applicator (formation of a first polyamide resin layer).

This was dried in a mathis oven at about 120° C. for about 15 minutes, cured at about 250° C. for about 30 minutes while flowing nitrogen, and then peeled from the substrate to obtain a polyamide film laminate having a thickness of 50.0 μm.

In the laminate, the thickness of the second polyamide resin layer was 35 μm and the thickness of the first polyamide resin layer was 15 μm.

Comparative Example 1 (Single Layer)

100 parts by weight of the first polyamide copolymer obtained in Preparation Example 1-1 and 5 parts by weight of a UV stabilizer (Tinuvin 329, manufactured by BASF) were dissolved in N,N-dimethylacetamide to prepare a first polyamide copolymer solution of about 15 wt %.

The first polyamide copolymer solution was applied on a polyimide-based substrate (UPILEX-75s, manufactured by UBE), and the thickness of the polymer solution was uniformly controlled using a film applicator.

This was dried in a mathis oven at about 120° C. for about 15 minutes, cured at about 250° C. for about 30 minutes while flowing nitrogen, and then peeled from the substrate to obtain a polyamide film having a thickness of 50.0 μm.

Comparative Example 2 (Single Layer)

100 parts by weight of the first polyamide copolymer obtained in Preparation Example 1-2 and 5 parts by weight of a UV stabilizer (Tinuvin 329, manufactured by BASF) were dissolved in N,N-dimethylacetamide to prepare a first polyamide copolymer solution of about 15 wt %.

The first polyamide copolymer solution was applied on a polyimide-based substrate (UPILEX-75s, manufactured by UBE), and the thickness of the polymer solution was uniformly controlled using a film applicator.

This was dried in a mathis oven at about 120° C. for about 15 minutes, cured at about 250° C. for about 30 minutes while flowing nitrogen, and then peeled from the substrate to obtain a polyamide film having a thickness of 50.0 μm.

Comparative Example 3 (Single Layer)

100 parts by weight of the second polyamide copolymer obtained in Preparation Example 2-1 and 5 parts by weight of a UV stabilizer (Tinuvin 329, manufactured by BASF) were dissolved in N,N-dimethylacetamide to prepare a second polyamide copolymer solution of about 15 wt %.

The second polyamide copolymer solution was applied on a polyimide-based substrate (UPILEX-75s, manufactured by UBE), and the thickness of the polymer solution was uniformly controlled using a film applicator.

This was dried in a mathis oven at about 120° C. for about 15 minutes, cured at about 250° C. for about 30 minutes while flowing nitrogen, and then peeled from the substrate to obtain a polyamide film having a thickness of 50.0 μm.

Experimental Examples

The following properties were measured or evaluated for the polyamide film laminates or the polyamide films of the Examples and Comparative Examples, and the results are summarized in Table 1 below.

Yellow Index (Y.I.): The yellow index ($YI_0$) of the film was measured according to the method of ASTM E313 using a COH-400 Spectrophotometer (NIPPON DENSHOKU INDUSTRIES).

The measured specimen was exposed to ultraviolet rays and moisture for 96 hours according to the method of ASTM G53-96, and then the yellow index of the film was measured again according to ASTM E313 ($YI_1$).

Haze: The haze of the film was measured according to the method of ASTM D 1003 using a COH-400 Spectrophotometer (NIPPON DENSHOKU INDUSTRIES).

Pencil hardness: The pencil hardness of the film was measured according to the method of ASTM D3363 using a Pencil Hardness Tester. Specifically, pencils of varying hardness values were fixed to the tester and scratched on the film, and the degree of occurrence of scratches on the film was observed with the naked eye or with a microscope. When more than 70% of the total number of scratches were not observed, a value corresponding to the hardness of the pencil was evaluated as the pencil hardness of the film. Table 2 shows the number of times (5 times in total) the film was scratched with a pencil of the corresponding hardness in the test and the number of scratches occurred therein.

Modulus and elongation: The modulus (GPB) and elongation (%) of the film were measured according to the method of ISO 527-3 using Universal Testing Systems (Instron® 3360).

Folding endurance: The folding endurance of the film was measured according to the method of ISO 5626 using a folding endurance tester.

Specifically, a specimen (1 cm×7 cm) of the film was loaded into the folding endurance tester at 25° C., and folded to an angle of 135° at a rate of 175 rpm on the left and right sides of the specimen, with a radius of curvature of 0.8 mm and a load of 250 g, until the specimen was fractured. The number of reciprocating bending cycles was measured as the folding endurance.

TABLE 1

| | Ex. 1 | Ex. 2 | Comp. Ex. 1 | Comp. Ex. 2 | Comp. Ex. 3 |
|---|---|---|---|---|---|
| $YI_0$ | 2.41 | 2.29 | 3.24 | 3.11 | 1.82 |
| $YI_1$ | 4.93 | 4.88 | 5.84 | 5.33 | 13.32 |
| $YI_1$-$YI_0$ | 2.52 | 2.59 | 2.6 | 2.5 | 11.5 |
| Haze (%) | 0.63 | 0.48 | 1.02 | 0.88 | 0.23 |

TABLE 1-continued

|  | Ex. 1 | Ex. 2 | Comp. Ex. 1 | Comp. Ex. 2 | Comp. Ex. 3 |
|---|---|---|---|---|---|
| Pencil hardness | 3H | 3H | 3H | 3H | B |
| Modulus (Gpa) | 6.85 | 6.73 | 7.77 | 7.15 | 6.24 |
| Elongation (%) | >15 | >15 | <10 | <10 | >15 |
| MIT (0.8 R) | >10,000 cycles | >10,000 cycles | <5,000 cycles | <5,000 cycles | >10,000 cycles |

Referring to the table above, it was confirmed that the polyamide film laminates according to the Examples had excellent mechanical properties such as high pencil hardness, modulus and elongation, as well as excellent optical properties such as low haze and low yellow index. Further, it was also confirmed that the laminates exhibited very high folding endurance.

Accordingly, the polyamide film laminate according to the embodiment of the present disclosure is considered to be applicable to a foldable display or the like.

The invention claimed is:

1. A polyamide film laminate, comprising
   A) a first polyamide resin layer comprising an amide bond by an aromatic diamino group and a benzene-dicarbonyl group,
   wherein the benzene dicarbonyl group comprises a benzene-1,3-dicarbonyl group and a benzene-1,4-dicarbonyl group,
   wherein a ratio of the benzene-1,3-dicarbonyl group to a total of the benzene-1,3-dicarbonyl group and the benzene-1,4-dicarbonyl group in the first polyamide resin layer is 2 mol % to 8.8 mol %, and
   B) a second polyamide resin layer formed on at least one surface of the first polyamide resin layer and comprising an amide bond by an aromatic diamino group and a benzene-dicarbonyl group,
   wherein the benzene dicarbonyl group comprises a benzene-1,3-dicarbonyl group and a benzene-1,4-dicarbonyl group,
   wherein a ratio of the benzene-1,3-dicarbonyl group to a total of the benzene-1,3-dicarbonyl group and the benzene-1,4-dicarbonyl group in the second polyamide resin layer is more than 20 mol % and 40 mol % or less.

2. The polyamide film laminate of claim 1,
   wherein a ratio of the benzene-1,3-dicarbonyl group to a total of the benzene-1,3-dicarbonyl group and the benzene-1,4-dicarbonyl group is 5 to 25 mol % in the entire polyamide film laminate.

3. The polyamide film laminate of claim 1,
   wherein a thickness ratio of the first polyamide resin layer and the second polyamide resin layer is 30:70 to 1:99.

4. The polyamide film laminate of claim 1,
   wherein the aromatic diamino group in the first and second polyamide resin layers has a diamino group each independently derived from at least one selected from the group of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, and 4,4'-diaminobenzanilide.

5. The polyamide film laminate of claim 1,
   wherein the polyamide film laminate satisfies Formula 1:

$$YI_1 - YI_0 < 3.0 \quad [\text{Formula 1}]$$

in the Formula 1,
   $YI_1$ and $YI_0$ are measured according to ASTM E313,
   $YI_0$ is an initial yellow index of the polyamide film laminate, and
   $YI_1$ is a yellow index of the polyamide film laminate as measured after exposing the polyamide film laminate to ultraviolet rays and moisture for 96 hours according to ASTM G53-96.

6. The polyamide film laminate of claim 1,
   wherein the polyamide film laminate has a haze value of 1.0 or less as measured according to ASTM D 1003.

7. The polyamide film laminate of claim 1,
   wherein the polyamide film laminate has a modulus value of at least 6 as measured according to ISO 527-3.

8. The polyamide film laminate of claim 1,
   wherein the polyamide film laminate has an elongation of at least 10% as measured according to ISO 527-3.

9. The polyamide film laminate of claim 1,
   wherein the polyamide film laminate has a pencil hardness of at least 3H as measured according to ASTM D336.

10. The polyamide film laminate of claim 1, comprising a substrate;
    the first polyamide resin layer; and
    the second polyamide resin layer.

11. The polyamide film laminate of claim 10,
    wherein the substrate is at least one polymer substrate selected from the group of polyimide-based polymer, polycarbonate-based polymer, polyester-based polymer, polyalkyl(meth)acrylate-based polymer, polyolefin-based polymer and polycyclicolefin-based polymer.

* * * * *